United States Patent [19]
Hsieh

[11] 3,871,273
[45] Mar. 18, 1975

[54] BEVERAGE MAKING APPARATUS

[76] Inventor: Chin-Yuan Hsieh, No. 35, Hsia Tan De, Pei Lei, Chia I, Taiwan, China

[22] Filed: Aug. 14, 1973

[21] Appl. No.: 388,277

[52] U.S. Cl. .................................. 99/286, 99/323.3
[51] Int. Cl. ............................................. A47j 31/42
[58] Field of Search .......... 99/323.3, 283, 284, 285, 99/286, 287, 288, 289, 290

[56] References Cited
UNITED STATES PATENTS

| | | | |
|---|---|---|---|
| 2,517,073 | 8/1950 | Alvarez | 99/286 X |
| 2,616,908 | 11/1952 | Colbeth et al. | 99/286 UX |
| 2,827,845 | 3/1958 | Richeson | 99/287 X |
| 2,858,762 | 11/1958 | Wade | 99/287 |
| 3,092,011 | 6/1963 | Gee, Jr. | 99/287 |
| 3,153,377 | 10/1964 | Bosak | 99/286 X |
| 3,565,641 | 2/1971 | King | 99/287 X |

Primary Examiner—Peter Feldman
Assistant Examiner—Arthur O. Henderson
Attorney, Agent, or Firm—Strauch, Nolan, Neale, Nies & Kurz

[57] ABSTRACT

Predetermined quantities of a food component such as soybean and a liquid component such as water are mixed and ground to form a slurry from which liquid beverage is extracted and stored for use at a predetermined warm temperature level in a heater tank. An electrical control circuit is provided for automatic sequential operation of the guiding and separating operations and the heater.

10 Claims, 6 Drawing Figures

BEVERAGE MAKING APPARATUS

This invention relates to beverage making apparatus and particularly to such apparatus wherein sequential opeations of feeding, grinding, separating and heating the product are automatically controlled.

In its preferred embodiment the invention will be disclosed as embodied in apparatus particularly designed for preparing soybean milk in condition for immediate consumption, but it will be understood that the invention is equally applicable to the preparation of other beverages such as corn milk, rice milk, fruit juice, coffee, cocoa and bean curd.

Soybean milk has long been popular in Eastern countries and especially in China because of its recognized nutritious value. Soybean milk is usually drunk at breakfast in China, and the preparation thereof involves tedious manual processes. For example, one has to get up two to three hours before breakfast time, use a stone grinder to grind soaked soybean and then drain to separate the pulp from the milk which is later heated to supply the family. Many families buy ready made soybean milk from the stores, but this is usually too weak and not as hot as in home made milk. No gourmet would prefer the store-sold soybean milk.

It is therefore the major object of the present invention to provide an automatic beverage making apparatus wherein predetermined charges of water or another liquid component and a solid food component such as soybean are mixed and ground to a slurry, the slurry is separated to extract the soybean milk or other product beverage, and the milk is heated to and maintained at a desired temperature for consumption.

A further and more specific object of the invention is to provide in the foregoing apparatus a novel control system regulating feeding of the food and liquid components to the grinder and after separation the beverage is automatically raised to the desired temperature for consumption.

PREFERRED EMBODIMENTS

Figure 1:
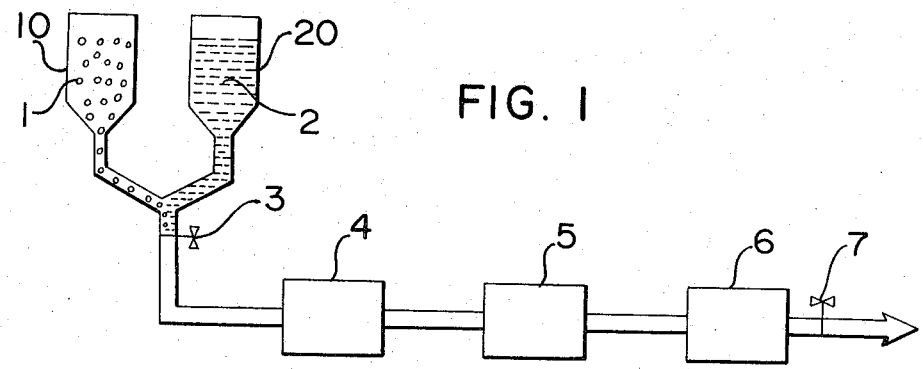
FIG. 1 is a diagrammatic showing of the apparatus for sequentially feeding, separating and heating material.

Referring first to FIG. 1, proportionate quantities of soaked soybean 1 and water 2 are charged respectively to bins or hoppers 10 and 20, and are conveyed through a solenoid valve 3 to a grinder 4. The operation of solenoid valve 3 and grinder 4 are synchronized. When the grinder starts, solenoid valve 3 is opened simultaneously to let the fluent soybean and water components feed by gravity into grinder 4, and when the grinder stops the valve 3 stops feeding. The ground soybean slurry is extracted from grinder 4 and fed into a separator 5, where it is separated into pulp and milk, the pulp being left in a separating basket while the milk is led through a conduit into the chamber of a heating tank 6, the temperature of which is controlled by a thermostat. Soybean milk of a desired temperature may be tapped from valve 7.

Figure 2:
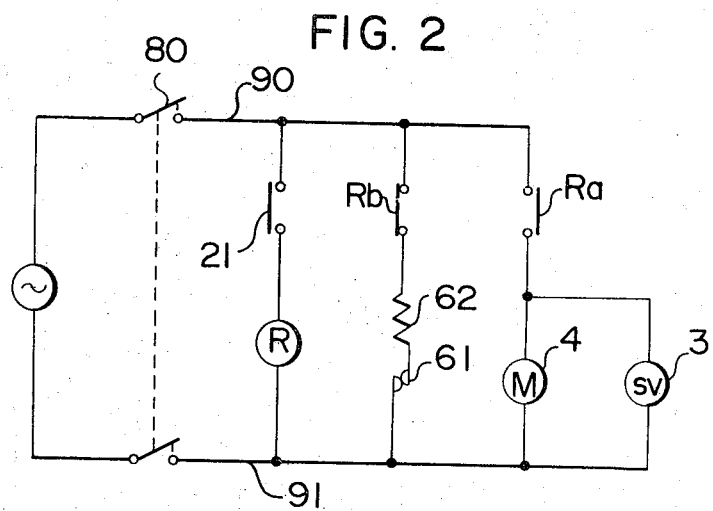
FIG. 2 is an electrical control circuit diagram for the apparatus.
Figure 3A:
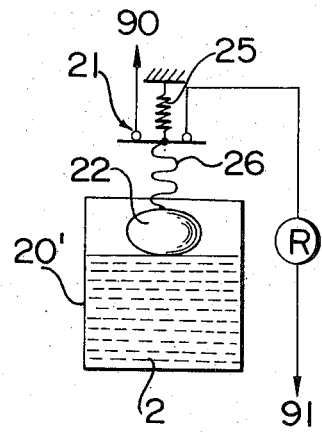
FIGS. 3A and 3B are fragmentary views showing operation of the float controlled switch.
Figure 3B:
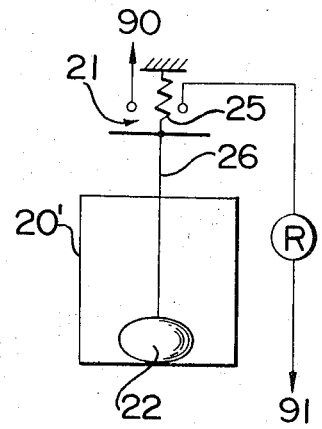

FIG. 2 shows the electrical control circuit. A bin level switch 21 is actuated in response to the level of water in bin 20, a chamber section 20' of bin 20 being provided for the installation of a float 22. FIGS. 3A and 3B detail the action of the level switch 21 controlled by the float 22 that rises and falls with the water level. As the float 22 rises with the charging of the batch, a movable contact arm of switch 21 by the aid of a spring 25 and the flexible suspension wire 26 bridges the stationary contacts of switch 21, so that the circuit is thereby closed. The float 22 falls by gravity with exhausting of the batch, and when movable contact arm of switch 21 leaves the stationary contacts of switch 21, the circuit is thereby opened at that point.

Preferably the relative amounts of soybean and water are such that both bins 10 and 20 become emptied at the same time, and when the water in chamber 20' is exhausted the unsupported weight of the float exerts sufficient force to open switch 21 against the pull of spring 25. When the chamber 20' is charged with water the float rises to enable spring 25 to close the switch 21.

Referring to FIG. 2 for continuing description of the control circuit, after the feeding bins 10 and 20 have been charged, the circuit is energized by closing a main switch 80 manually or with a preset timer, and the mains voltage is applied to terminals 90 and 91. Relay coil R is thereby energized through the closed float switch 21. Upon the energization of relay coil R, a normal open contact Ra thereof is closed and a normally closed contact thereof Rb is opened. Closing of contact Ra actuates solenoid valve 3 to let the soybean and water components enter into grinder 4, which latter starts grinding as a result of its motor M being energized by the closing of contact Ra. The ground product flows from grinder 4 in a slurry form consisting of pulp and milk, and milk separated by separator 5 is then conveyed to heating tank 6.

When the float 22 falls as shown in FIG. 3B, level switch 21 opens so that relay coil R is de-energized, grinder 4 is stopped and solenoid valve 3 is closed. When contact Rb now closes heater 62 is energized through a line containing the thermostat 61. Heater 62 now heats the milk to a preset temperature, say approaching 100°C. Thermostat 62 is set to open the heater circuit then until the milk temperature lowers down to a certain predetermined temperature, say 80°C. If the milk temperature lowers to 80°C the thermostat re-closes, so that the temperature of the milk in heater compartment 6 is always maintained at a range of 80°C–100°C.

Figure 4:
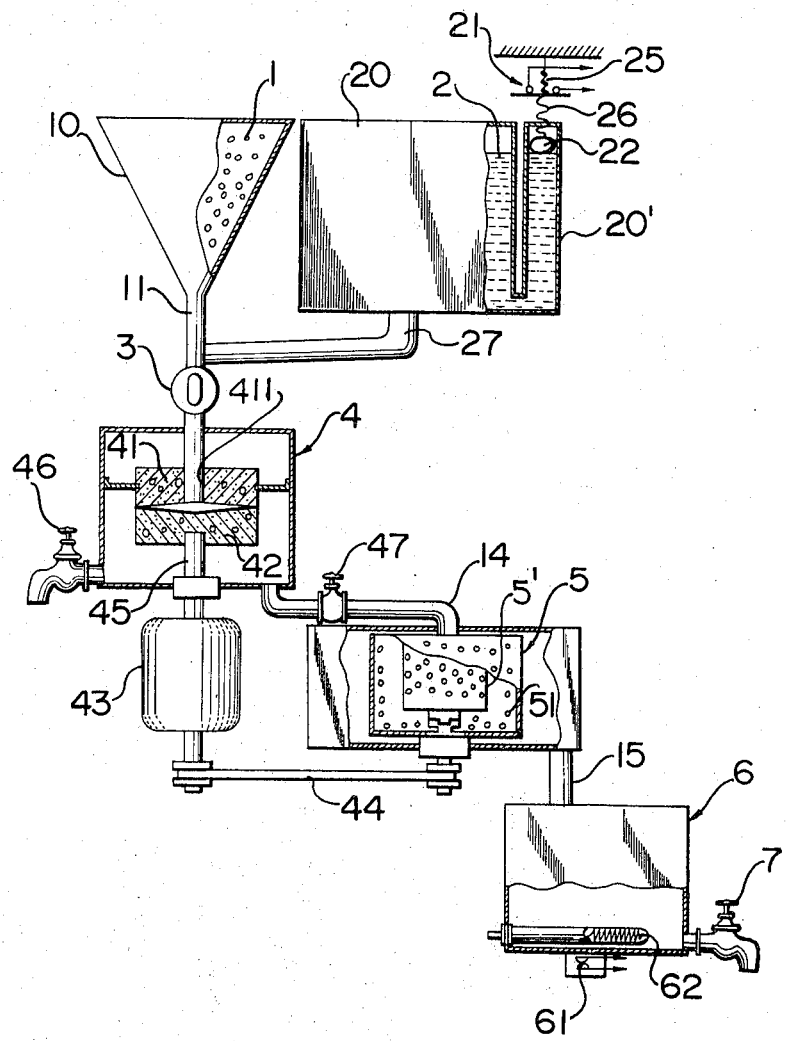
FIG. 4 is an elevation mainly in section showing the apparatus according to a preferred practical embodiment.

FIG. 4 illustrates a preferred practical embodiment of the invention. As shown, soybean is charged into bin 10 and water is charged into bin 20 and the level switch 21 is closed. Water does not flow through conduit 27 until switch 21 closes to open valve 3. The relative sizes of pipe 11 for soybean and pipe 27 for water are appropriately selected to control the rates of flow through each and therefore the rate of mixing. Through the open solenoid valve 3, the mixed stock is charged into the hole 411 of a stator disc 41 of a horizontal disc type grinder 4, the moving disc 42 of grinder 4 being driven directly through shaft 45 of a motor 43 that also drives the separator through belt 44. Ground slurry containing pulp and milk flows by gravity from the chamber of grinder 4 through pipe 14 into the separator 5, which contains an inner basket 5' and is of the centrifugal type being driven by the belt 44. Milk 13 is separated from the pulp by being thrown out through a plurality of basket holes 51, and the pulp stays in the inner basket 5' of separator 5. The separated milk then flows by gravity into heating tank 6 through pipe 15, and the temperature of the milk is determined by element 62 controlled by a bi-metal element at 61 to be raised and maintained at a predetermined range. The final product may be diluted if desired. The hot soybean milk may be tapped as needed from valve 7. It is also advisable to add a separate outlet valve 46 for the chamber of grinder 4 and a valve 47 in the slurry outlet to slip stream the slurry for other uses such as making deserts if desired.

Figure 5:
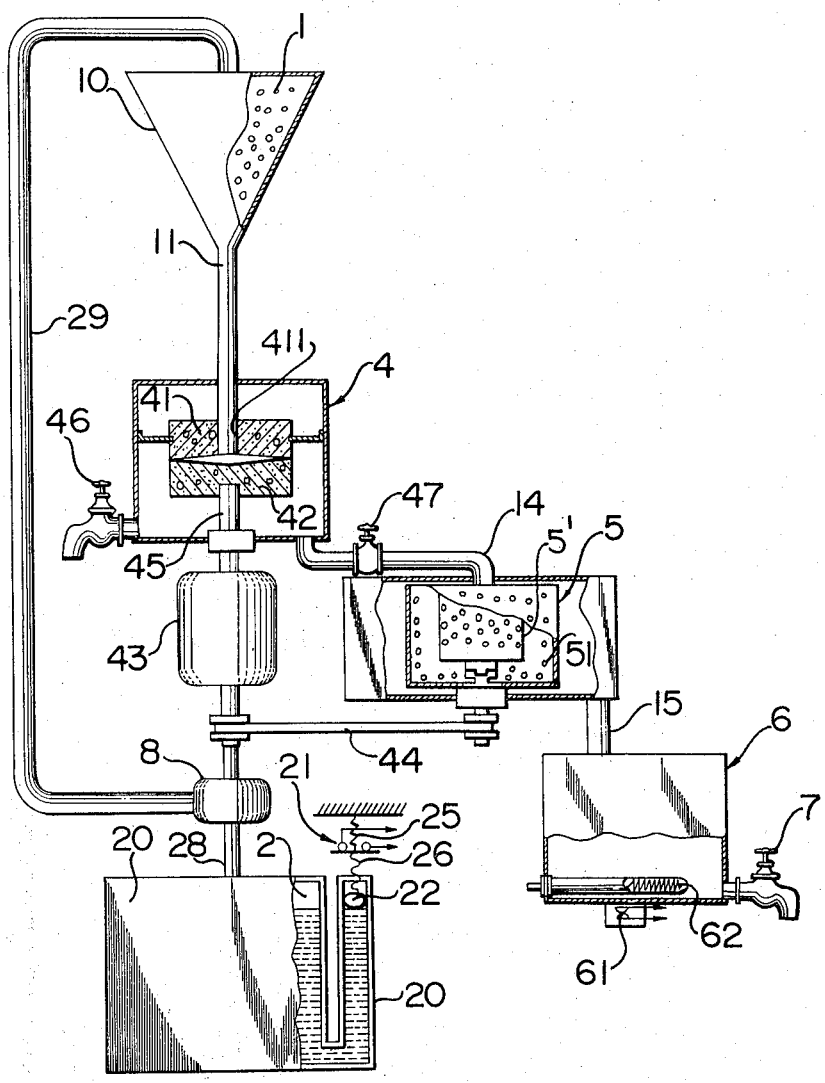
FIG. 5 is an elevation similar to FIG. 4 but showing an embodiment wherein the food and water components are differently mixed.

A second structural embodiment of the invention is shown in FIG. 5 wherein the same reference numerals or symbols designate the same or corresponding elements in the above described embodiment of FIG. 4. In FIG. 5 embodiment, the water container 20 is mounted at the bottom of the apparatus and water 2 in container 20 is supplied directly into the bin 10 by a pump 8 through pipes 28 and 29. The pump 8 is driven directly from shaft 45 of motor 43. Solenoid valve 3 is not provided in this embodiment wherein water flow ceases when the pump motor is de-energized by float switch 21.

In operation in both of the embodiments of FIGS. 4 and 5 since the motor 43 drives both the grinder and the separator, opening of relay contact Ra is preferably timed to insure that all of the slurry has been centrifuged before the separator stops.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for making a beverage in a single operation comprising a solid food feeding means, a liquid feeding means, a grinding means arranged in sequence with a separating means and a heating means, an electric motor connected to drive said grinding means and said separating means, means for supplying a mixture of solid and liquid food from said feeding means into said grinding means, means for conveying the resultant slurry from the grinding means to the separating means where the beverage is extracted, means for conveying the extracted beverage into said heating means, an electrical circuit containing said motor and an actuator for said mixture supply, and control means in said circuit responsive to the presence of a predetermined amount of liquid in said liquid feeding means for energizing said motor and operating said actuator to supply the mixture to the grinding means, said control means being further responsive in the absence of a predetermined amount of liquid in the liquid feeding means to deenergize said motor and operate said actuator to arrest supply of said mixture.

2. Apparatus as defined in claim 1, wherein said heating means comprises a chamber receiving the beverage and having an electrical heater connected to said circuit so as to be energized by action of said control means when said motor is deenergized.

3. Apparatus as defined in claim 2, including means connected to said electrical heater for maintaining the temperature of the beverage in said chamber within a predetermined range.

4. Apparatus as defined in claim 1, wherein said solid and liquid foods are combined in passage means leading from the respective feeding means to said grinding means, and said actuator is an electrically operated valve for said passage means connected in said circuit to be actuated by said control means.

5. Apparatus as defined in claim 1, wherein liquid from the liquid feeding means is conveyed by a pump directly into the solid food feeding means for admixture, and said pump is driven by the motor and serves as the actuator for said mixture supply means.

6. Apparatus as defined in claim 1, wherein said control means includes switch means in said circuit operatively connected to a float in said liquid feeding means.

7. In the apparatus defined in claim 1, said electrical circuit containing a relay having switching contacts connected to said electric motor and said heating means, and the presence or absence of a certain amount of liquid in said liquid feeding means being a float controlled switch for said relay to thereby selectively energize either the said motor or the heating means.

8. Apparatus for making beverages in a continuous operation comprising means providing separate bins wherein predetermined amounts of relatively solid food and liquid components of the beverage are charged, grinding and separating devices arranged in sequence, means for feeding and mixing proportioned amounts of the relatively solid food components and liquid component from said bins and for feeding the mixture into the grinding device, an electrical circuit containing means responsive to the presence of a predetermined amount of liquid in the liquid component bin for energizing electric motor means connected to drive said grinding and separating devices, means conveying the resulting slurry into the separating device wherein a relatively liquid beverage is extracted, a heater having a chamber into which said beverage is conveyed from the separator, electrical heating means for said heater connected into said circuit to be energized in timed relation to the grinding and separating operations for raising the temperature of said beverage in said chamber to and maintaining it within a predetermined range, and means in said circuit automatically effective after completion of the grinding and separating operations for deenergizing said motor means and energizing said electrical heating means.

9. In the apparatus defined in claim 8, said circuit containing a relay having switching contacts connected to said motor means and said electrical heating devices, and said means responsive to the presence of liquid in the liquid component bin being a float controlled switch for said relay.

10. In the apparatus defined in claim 8, thermostatic means in said circuit for controlling energization of said electrical heating means to maintain the temperature of the beverage in said heater chamber within said range.

* * * * *